United States Patent [19]

Bachman et al.

[11] Patent Number: 4,763,692
[45] Date of Patent: Aug. 16, 1988

[54] ROTARY VALVE STRUCTURE

[75] Inventors: Wesley J. Bachman, Auburn; Edmund J. Gorsek, Springfield, both of Ill.

[73] Assignee: Dickey-john Corporation, Auburn, Ill.

[21] Appl. No.: 40,595

[22] Filed: Apr. 20, 1987

[51] Int. Cl.$^4$ .............................................. F16K 3/02
[52] U.S. Cl. .......................... 137/625.3; 137/625.31; 251/208
[58] Field of Search ........................ 137/625.3, 625.31; 251/208

[56] References Cited

U.S. PATENT DOCUMENTS 4,192,349  3/1980  Schroeder ........................ 137/887 X Primary Examiner—Gerald A. Michalsky
Attorney, Agent, or Firm—Trexler, Bushnell, Giangiorgi & Blackstone, Ltd.

[57] ABSTRACT

A valve body comprises a substantially solid body defining a surface of complementary form for engaging a valve seat, and having a pivot axis about which it is rotatably mounted relative to a valve orifice. A periphery of the valve body surface defines at least first and second curvilinear surfaces having axes of curvature which extend substantially parallel with each other and with the pivot axis of the valve body. The axis of curvature of a first of said curvilinear surfaces is disposed inwardly of the first surface and within the periphery of the valve body; and the axis of curvature of the second of the curvilinear surfaces is disposed on the opposite side of the second curvilinear surface and outside of the periphery of the valve body. A remaining portion of the valve body surface defines a cross-sectional area at least as great as the cross-sectional area of the valve orifice for fully covering the same when in a valve closed position. The first and second curvilinear surfaces following sequentially from the remaining surface, and being oriented such that during rotation of the valve body about its pivot axis, the first surface will initially come into registry with the valve orifice for initially relatively slowly opening the valve, and thereafter the second surface will come into registry with the valve orifice for thereafter relatively rapidly opening the valve.

20 Claims, 2 Drawing Sheets

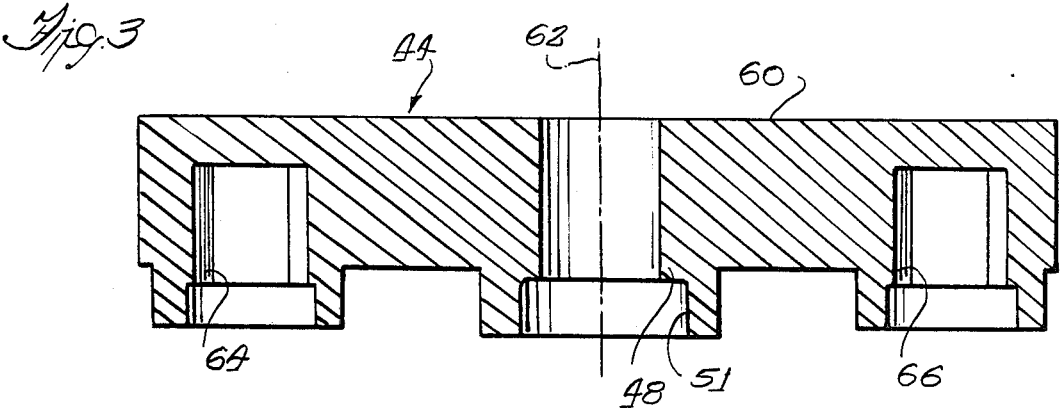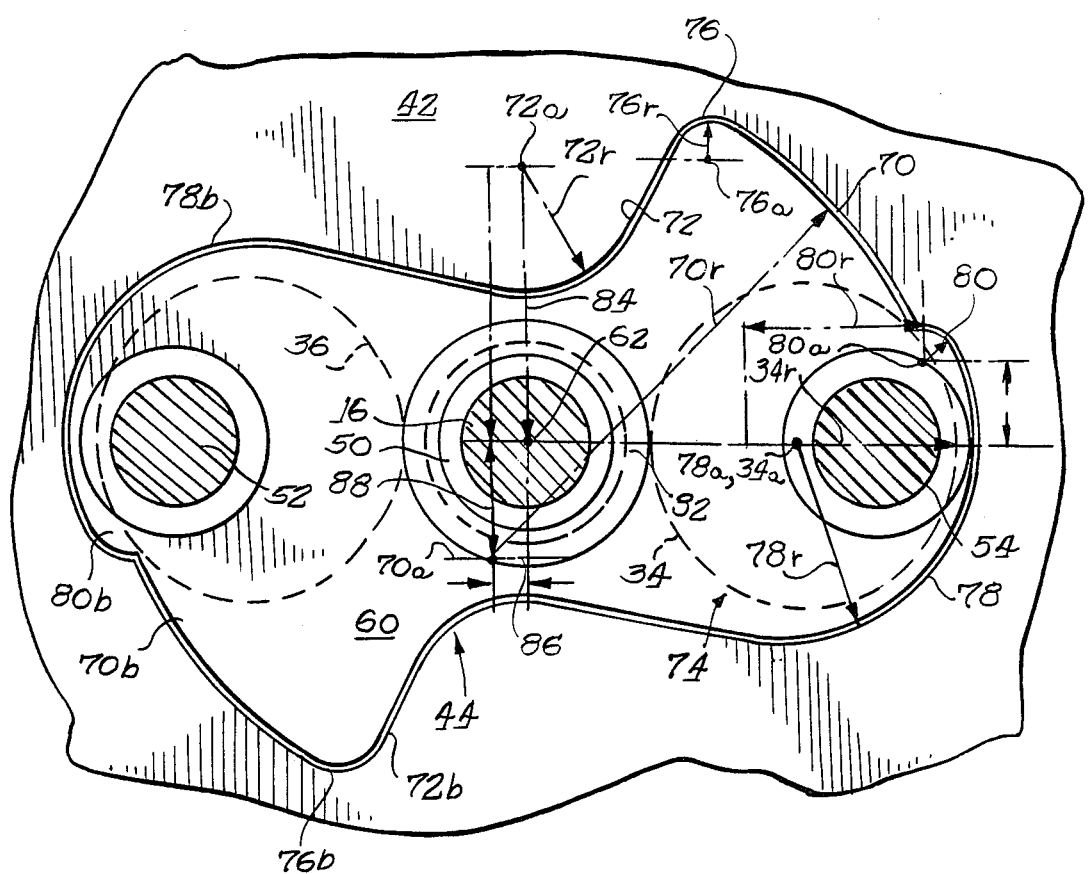

ROTARY VALVE STRUCTURE

BACKGROUND OF THE INVENTION

This application is directed generally to the valve arts, and more particularly to a novel and improved type of rotary valve structure useful over a broad range of applications.

Many and varied applications require controllable valve arrangements for various purposes. For example, in material distribution systems, such as on-the-road or off-the-road spreader and sprayer apparatus, control valves for controlling the distribution of material must be accurately controlled from the operator's cab of the vehicle. Examples of such material distribution apparatus are agricultural fertilizer sprayer and/or spreaders, as well as machines used in agriculture for distributing various insecticides, herbicides, and other materials. It will be appreciated that such materials may be in either liquid or granular form.

Similarly, over-the-road vehicles may be utilized variously to spray liquid materials or spread granular materials for purposes such as dust control, for providing binder materials for some road surfaces, and for various ice control products. All of these applications require that some control arrangement be provided to control the flow of material to a distribution device, which may be a spray bar having one or more nozzles for spraying liquid materials, or a rotary broadcast type spreader or other spreader for distributing granular materials.

Such a control arrangement valve may employ a control valve in line with the supply of liquid to be sprayed at the nozzles, or in a return line. if desired, to control the pressure and/or flow at the nozzles. Alternatively, this control valve may be used as a control valve in a hydraulic or other control system for controlling the speed of one or more pumps, drive motors for conveyors, or other devices for delivering the liquid or granular material to the nozzles or other spreader apparatus for distribution.

In any of the foregoing applications, it is desirable to provide a valve which is capable of controlling flow over a relatively broad range, and has relatively fast response time to control signals applied thereto, while maintaining relatively high resolution. The ability to provide a wide range of valve openings from fully closed to fully opened must be coupled with a relatively high degree of resolution, in order to maintain accurate control over a broad range of desired material delivery rates. The ability to respond relatively quickly to control signals is important in order to both initially achieve and therafter maintain a desired distribution rate, since the speed of the vehicle distributing the material may vary considerably during spraying or spreading. Preferably, and especially in the case of some fertilizer materials, such as anhydrous ammonia, it is important that the valve be positively seated when in a closed position so as to positively seal against leakage of such materials when the distribution apparatus is not in operation. However, such a valve must also have a relatively low initial inertia or initial required torque, to assure relatively rapid response for quick start-up at a desired distribution rate.

While it is often desirable to provide for relatively small incremental changes in the degree of valve opening in such a control valve, it is also desirable in some instances to provide for rather great, and rapidly achievable incremental amounts of opening. The former is generally true at the low end or initial portion of the opening of a control valve, while the latter generally applies to the later or subsequent portion of opening prior to reaching the fully opened position.

The novel and improved valve of the invention substantially meets the foregoing requirements, while advantageously being relatively simple and inexpensive in its manufacture and design.

Briefly, and in accordance with the foregoing considerations, a novel and improved rotary valve comprises a valve body and a valve seat defining an orifice, said valve body being rotatable relative to said valve seat for selectively seating and unseating relative thereto and movable through a continuous range of intermediate positions between a valve closed position wherein the orifice is fully covered by the valve body and a valve fully open position wherein the orifice is substantially entirely free of the valve body; wherein said valve body comprises a substantially solid body defining a surface of complementary form for engaging said valve seat, and having a pivot axis about which said valve body is rotatably mounted relative to said valve orifice, a periphery of said valve surface defining at least first and second curvilinear surfaces having axes of curvature which extend substantially parallel with each other and with the pivot axis of the valve body; the axis of curvature of a first of said curvilinear surfaces being disposed inwardly of the said first surface and within the periphery of the valve body; and the axis of curvature of the second of said curvilinear surfaces being disposed on the opposite side of the said second curvilinear surface and outside of the periphery of the valve body, and a remaining portion of said valve body surface defining a cross-sectional area at least as great as the cross-sectional area of the valve orifice for fully covering the same when in the valve closed position; said first and second curvilinear surfaces following sequentially from said remaining surface and being oriented such that during rotation of the valve body about its pivot axis, the first surface will initially come into registry with said valve orifice for initially relatively slowly opening the valve, and thereafter said second surface will come into registry with said valve orifice for thereafter relatively rapidly opening said valve.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 3 is a further enlarged sectional elevation through a valve body in accordance with the invention; and FIG. 4 is an enlarged, partial view taken generally in the plane of the line 4—4 of FIG. 1.

DETAILED DESCRIPTION OF THE ILLUSTRATED EMBODIMENT

Figure 1:
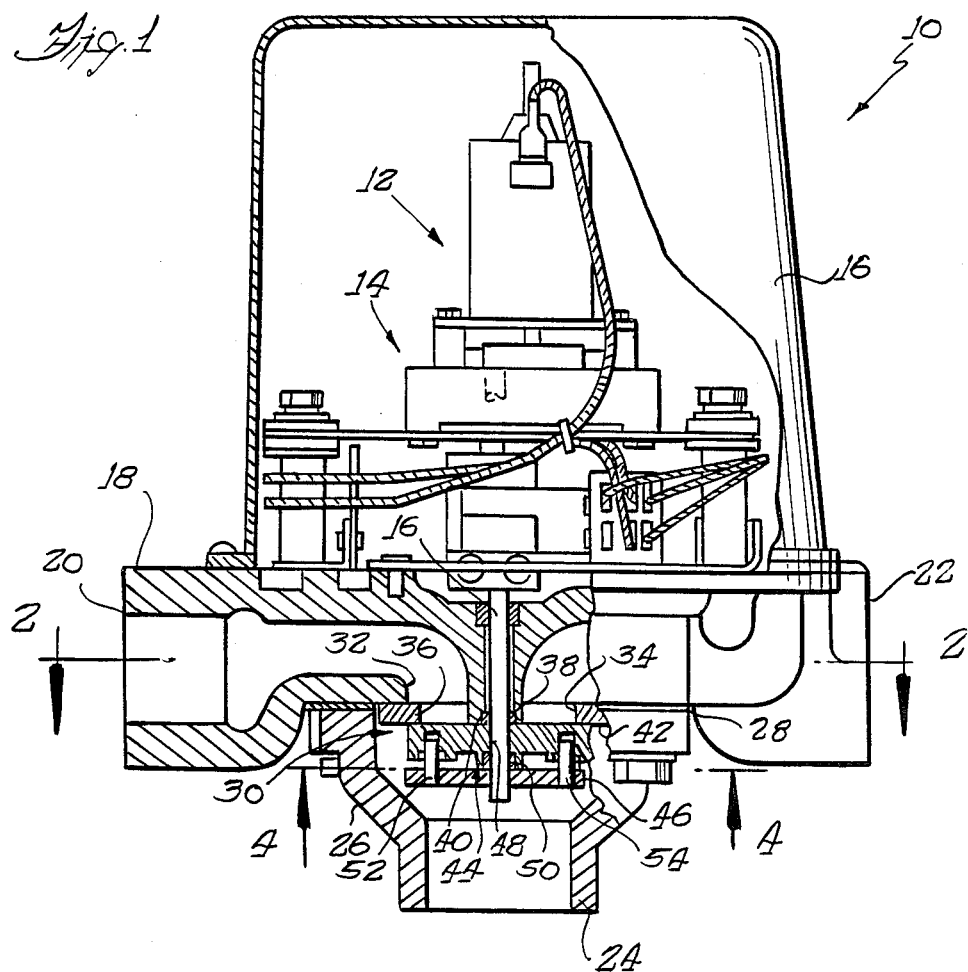
FIG. 1 is a side elevation, partially broken away and partially in section, illustrating a control valve in accordance with the invention.
Figure 2:
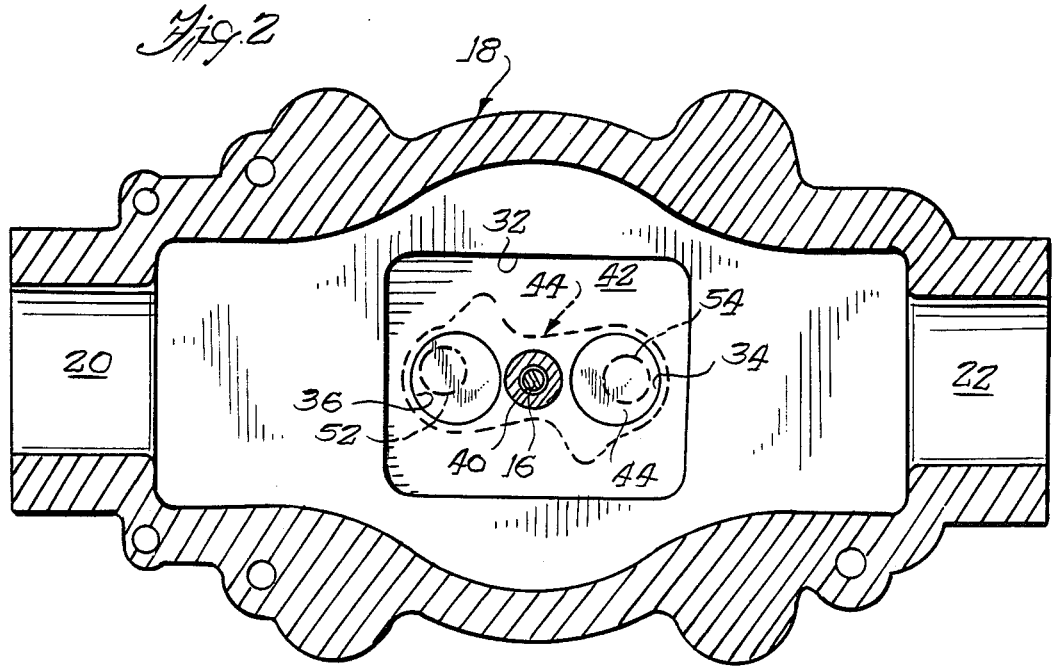
FIG. 2 is a somewhat enlarged sectional view taken generally in the plane of the line 2—2 of FIG. 1.

Referring now to the drawings, and initially to FIGS. 1 and 2, a novel valve in accordance with the invention is designated generally by the reference numeral 10. In the embodiment illustrated, the valve 10 is motor actuated by means of a motor 12 which may be either electrically or hydraulically driven. Suitable intermediate gearing 14 may also be utilized to adjust the rotational rate of a valve shaft 16 to a desired rate for actuating the valve. The motor and related drive components are preferably encased within a protective housing 16 which is bolted or otherwise secured to a first valve assembly body or portion casting 18. This first valve assembly body portion 18 includes respective coaxially aligned openings or orifice portions 20, 22 which are internally threaded for receiving complementary conduits or the like (not shown), such that the valve may be placed "in line". A valve outlet orifice or portion 24 is formed in a second valve assembly body portion or casting 26 which is bolted or otherwise engaged with a lower mid-portion first valve assembly body portion 18, and preferably with an intermediate sealing grommet member 28 interposed therebetween. It should be understood that the specific form of the valve thus far described forms no part of the invention, and hence the invention is not limited to the specific valve construction shown.

The valve assembly 10 includes a valve in accordance with the invention, designated generally by reference numeral 30. The valve 30 is interposed between valve assembly body portions or castings 18 and 26, and generally comprises a valve plate member 32 which has a pair of spaced apart through openings 34, 36 defining the effective valve orifice and also effectively defining the path of fluid flow between valve assembly body portions 18 and 26. The plate 30 further has a through central shaft-receiving opening 38 which is preferably arranged with a suitable sealing ring 40 to permit the valve shaft 16 to extend therethrough for rotation while maintaining a seal thereabout. The valve plate 32 defines at its outlet surface, a valve seat 42 generally surrounding the orifices 34 and 36, which valve seat is substantially flat in the illustrated embodiment.

In accordance with the invention, a valve closure member or valve body 44 is rotatably mounted to shaft 16. Valve body 44 is rotatable relative to the valve seat 42 through a continuous range of positions between a valve closed position wherein the valve orifice or orifices 34, 36 are fully covered by the valve body and a valve fully opened position wherein the orifices 34, 36 are substantially open, free of the valve body 44. In the illustrated embodiment, the valve body 44 is carried by a carrier plate 46 which is in turn non-rotatably fitted to the drive shaft 16, preferably in a pressfit. The valve body 44 also includes a central through opening 48 for receiving the shaft therethrough, and preferably an additional sealing ring 50 is seated in an annular groove provided in an undersurface of the valve body about the shaft 16. A pair of keying members or pins 52, 54 generally key or secure the carrier plate 46 with the valve body 44 so that the two rotate in unison upon rotation of shaft 16. Cooperatively, the valve body includes additional recesses or bores 64, 66 which are of complementary form for receiving the pins 52, 54 which join the valve body to the carrier plate.

In accordance with an important feature of the invention, and referring now also to the remaining figures of the drawings, the valve body presents a unique peripheral configuration relative to the valve orifices 34, 36. Initially, it will be noted that the valve body presents a relatively smooth continuous surface 60 to the valve orifices 34, 36, and this surface is of complementary form for sealingly engaging the valve seat 42. In the illustrated embodiment, this surface 60 is substantially flat and planar, as is the valve seat 42. The valve body 44 defines a pivot axis 62 which comprises the central axis of central through opening 48 which receives and is coaxial with the valve shaft 16.

As best viewed in FIG. 4, it will be noted that the illustrated embodiment comprises a bi-ended valve which comprises generally oppositely oriented and identical valve body or closure portions for cooperating with the respective valve orifices 34 and 36. It will be noted however, that the invention is not so limited, in that but a single such valve orifice and a single-ended valve body may be utilized in connection with a single such orifice without departing from the invention. Accordingly, with reference to FIG. 4, one-half of the valve body will be described in detail, it being understood that the other half of the valve body is substantially identical and oppositely oriented for cooperation with the second valve orifice 36.

In accordance with the invention, the periphery of the valve surface 60 defines at least first and second peripheral curvilinear surfaces 70, 72 having axes of curvature 70a, 72a which extend substantially parallel with each other and with the pivot axis 62 of the valve body. The axis of curvature 70a of the first curvilinear surface 70 is disposed inwardly of the surface 70, that is, within the periphery of the valve body 44. The axis of curvature 72a of the second curvilinear surface 72 is disposed on the opposite side or outside of surface 72, that is, outside of the periphery of the valve body 44. A remaining portion 74 of the valve body surface defines a cross-sectional area at least equal to the cross-sectional area of the valve orifice 34 for fully covering the same when the valve is in the valve closed position.

Moreover, the respective first and second curvilinear surfaces 70 and 72 follow sequentially the remaining or main surface portion of 74 of the valve body surface 60. The arrangement and orientation of these surfaces is such that during rotation of the valve body about its pivot axis 62, which rotation is in the counterclockwise direction as viewed in FIG. 4, the first surface 70 will initially come into registry with the valve orifice 34. It will be seen that as the curve 70 is a generally convex curve relative to the orifice 34, the opening of the valve while the surface 70 is in registry with orifice 34 will be relatively slowly or gradually in accordance with the curvature and orientation of the curvilinear peripheral surface 70. Thereafter, the second surface 72 will come into registry with the valve orifice 34. In contrast to the operation of the first portion of valve opening with first surface 70, the second surface 72 is of a generally concave curvature, and its orientation is such that the further opening of the valve will proceed relatively rapidly as the surface 72 proceeds in the counterclockwise direction of valve rotation relative to orifice 34. In this regard, the trailing edge, in the direction of valve rotation, of surface 70 is disposed closely adjacent to a leading edge of the second curvilinear surface 72.

More specifically, a third curvilinear surface 76 is provided intermediate the first and second curvilinear surfaces 70, 72, this third surface being of a relatively small extent relative to the first and second surfaces and merging respectively tangentially therewith. The axis of curvature of 76a of this third surface 76 is parallel with the pivot axis 62 and disposed inside of the periphery of the valve body 44 with respect to the surface 76. Hence, this surface 76 is also a generally convex surface relative to the valve body. Preferably, the second curvilinear surface 72a defines a radius of curvature 72r which is smaller than the radius of curvature 70r defined by the first curvilinear surface 70. The remaining surface portion 74 of the valve body defines a fourth, outer peripheral curvilinear surface 78 which has an axis of curvature 78a parallel with the pivot axis and inside of the valve body with respect to the surface 78. This fourth surface further defines a radius of curvature 78r which is intermediate the radii of curvature 70r and 72r of the respective first and second curvilinear surfaces, and at least as great as the radius 34r of valve opening or orifice 34. Preferably, this fourth surface 78 is formed leading or ahead of surface 70 with respect to the direction of rotation of the valve body. Additionally, the surface 78 is joined with surface 70 by means of a further intermediate or fifth, relatively short curvilinear surface 80, which defines an axis of curvature 80a also parallel with pivot axis 62 and to the inside of the periphery of the valve body 44 with respect to surface 80, whereby surface 80 is generally convex with respect to the valve body 44.

In order to fully describe the preferred form of the invention illustrated herein, the ratios of the respective radii of curvature of the curved surfaces thus far defined to that of the first curvilinear surface 70, will be given, it being understood that the relative dimensions given are by way of example only and not intended to limit the invention in any way.

In the preferred embodiment illustrated, the radius of curvature 72r of the second surface is in a ratio of on the order of substantially 0.25 to the radius of curvature 70r of the first curvilinear surface 70. Preferably, the radius of curvature of 76r of curvilinear surface 76 is in a ratio of substantially on the order of 0.1 to the radius of curvature 70r. The radius of curvature 78r of peripheral surface 78 is in a ratio of substantially on the order of 0.4 to the radius of curvature 70r.

Preferably, the radius of curvature 80r of peripheral surface portion 80 is in a ratio of substantially on the order of 0.1 to the radius of curvature 70r. Moreover, the distance from axis 62 of the axis 34a, as well as the diameter of valve orifice 34 is in a ratio of substantially on the order of 0.750 to the radius of curvature of 70r.

For purposes of further defining the preferred embodiment illustrated, the relative locations of the axes of curvature of the various surfaces thus far described will also be given, relative to the pivot axis 62, in units of links stated as a ratio to the radius of curvature 70r the latter being taken as unity or 1.0. These loci in turn define the relative orientations of these surfaces top each other as well as to the valve orifice 34.

In this regard, the respective axes of curvature 78a and 72a of surfaces 78 and 72 are located along respective first and second radii 82, 84 extending from the pivot axis 62, which radii are orthogonally disposed. Preferably, these radii 82 and 84 are of substantially equal length, that is, axes 72a and 78a are substantially equidistant from pivot axis 62. The axis of curvature 70a of the first curvilinear surface 70 is offset from pivot axis 62 along first and second orthogonal coordinates defined by these first and second orthogonally disposed radii 82 and 84, however, at an opposite side of the pivot axis 62 therefrom. That is, the coordinates along which axis 70a lie are generally along extensions of respective radii 82, 84 to the other side of pivot axis 62. More specifically, a first orthogonal coordinate 86 of axis 70a bears a ratio of substantially on the order of 0.05 to the radius of curvatures 70r. The second orthogonal coordinate 88 of axis 70a bears a ratio substantially on the order of 0.2 relative to the radius of curvature 70r. The lengths of radii 82, 84, that is, the radial distance of axes 72a, 78a from pivot axis 62 bear a ratio of substantially on the order of 0.57 to the radius of curvature 70r. The axis 76a is located along orthogonal coordinates defined by radii 82 and 84 which respectively define distances which bear a ratio of on the order of 0.405 and 0.5765, respectively to radius 70r. Finally, the axis 80a lies on orthogonal coordinates along respective radii 82 and 84 which define ratios of substantially, 0.8413 and 0.15 to the radius of curvature 70r, measured from pivot axis 62.

As previously mentioned, the valve body in the preferred embodiment illustrated is bi-ended, thus defining substantially identical and oppositely disposed peripheral surfaces for cooperating with respective valve orifices 34, 36. The second surface portion or half defines peripheral surfaces substantially identical but oppositely disposed relative to the peripheral surfaces thus far described. Accordingly, the like peripheral curvilinear surface portions of the second valve body portion of half are indicated by like reference numerals with the suffix b. In this regard, peripheral surface 78b will be seen to merge tangentially with peripheral surface 72. Similarly, peripheral surface 72b merges tangentially with peripheral surface 74.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The Invention is claimed as follows:

1. A valve comprising a valve body and a valve seat defining an orifice, said valve body being rotatable relative to said valve seat for selectively seating and unseating relative thereto and movable through a continuous range of intermediate positions between a valve closed position wherein the orifice is fully covered by the valve body and a valve fully open position wherein the orifice is substantially entirely free of the valve body; wherein said valve body comprises a substantially solid body defining a surface of complementary form for engaging said valve seat, and having a pivot axis about which said valve body is rotatably mounted relative to said valve orifice, a periphery of said valve surface defining at least first and second curvilinear surfaces having axes of curvature which extend substantially parallel with each other and with the pivot axis of the valve body; the axis of curvature of a first of said curvilinear surfaces being disposed inwardly of the said first surface and within the periphery of the valve body; and the axis of curvature of the second of said curvilinear surfaces being disposed on the opposite side of the said second curvilinear surface and outside of the periphery of the valve body, and a remaining portion of said valve body surface defining a cross-sectional area at least as great as the cross-sectional area of the valve orifice for fully covering the same when in the valve closed position; said first and second curvilinear surfaces following sequentially from said remaining surface, and being oriented such that during rotation of the valve body about its pivot axis, the first surface will initially come into registry with said valve orifice for initially relatively slowly opening the valve, and thereafter said second surface will come into registry with said valve orifice for thereafter relatively rapidly opening said valve.

2. A valve according to claim 1 wherein a trailing edge of said first curvilinear surface is disposed closely adjacent a leading edge of said second curvilinear surface.

3. A valve according to claim 2 wherein a third curvilinear surface is provided intermediate the first and second curvilinear surfaces, said third surface being of relatively small extent relative to the first and second surfaces and merging respectively tangentially therewith, the axis of curvature of said third surface being parallel with said pivot axis and disposed inside the periphery of said valve body with respect to said third surface.

4. A valve according to claim 3 wherein the radius of curvature of said third curvilinear surface is in a ratio of substantially on the order of 0.1 to the radius of curvature of said first curvilinear surface.

5. A valve according to claim 1 wherein said second curvilinear surface defines a radius of curvature smaller than the radius of curvature defined by the first curvilinear surface.

6. A valve according to claim 1 wherein said remaining surface portion of said valve body defines a further peripheral curvilinear surface having an axis of curvature inside of the periphery of the valve body with respect to said surface and parallel with the pivot axis of the valve body, and defining a radius of curvature which is intermediate the radii of curvature of the respective first and second curvilinear surfaces and at least as great as the radius of the valve opening.

7. A valve according to claim 6 wherein the radius of curvature of said remaining peripheral surface of said valve body is in a ratio of substantially on the order of 0.4 to the radius of curvature of said first curvilinear surface.

8. A valve body according to claim 6 wherein the axis of curvature of the remaining peripheral surface is located a first radial distance along a first radius from said pivot axis and wherein the axis of curvature of said second curvilinear surface is located a second distance radially outwardly of said pivot axis along a radius orthogonal to the first radius.

9. A valve according to claim 8 wherein said first and second radial distances are substantially equal.

10. A valve according to claim 8 wherein the axis of curvature of said first curvilinear surface is offset from said pivot axis along first and second orthogonal coordinates defined by said first and second orthogonally disposed radii at respective first and second distances to the opposite side of said pivot axis from said first and second orthogonally disposed radii thereof.

11. A valve according to claim 10 wherein said first axis of curvature is located a distance from said pivot axis along said first orthogonal coordinate which bears a ratio of substantially on the order of 0.05 to the radius of curvature of said first curvilinear surface and along said second orthogonal coordinate a distance from the pivot axis which bears a ratio of substantially on the order of 0.2 relative to the radius of curvature of said first curvilinear surface.

12. A valve according to claim 6 and further including a, relatively short peripheral curvilinear surface joining a leading edge of the first curvilinear surface with a trailing edge of the remaining peripheral surface portion, the axis of curvature of said curvilinear surface also being parallel with said pivot axis and located inside of said periphery of said valve body, and the radius of curvature of said surface being smaller than the radii of curvature of any of the first, second or remaining peripheral curvilinear surfaces.

13. A valve according to claim 12 wherein the radius of curvature of said relatively short peripheral curvilinear surface bears a ratio of substantially on the order of 0.1 to the radius of curvature of the first curvilinear surface.

14. A valve according to claim 13 wherein said valve is bi-ended, defining substantially identical, and oppositely disposed peripheral surfaces to either side of said pivot axis, whereby substantially identical valve body portions are provided for cooperating with substantially identical and oppositely disposed valve seats and orifices located to either side of said pivot axis, to thereby form a composite valve having a pair of generally circular valve orifices disposed to either side of a central axis.

15. A valve according to claim 1, wherein the radius of curvature of said second surface is in a ratio of on the order of substantially 0.25 to the radius of curvature of said first curvilinear surface.

16. A valve according to claim 1 wherein said valve is bi-ended, defining substantially identical, and oppositely disposed peripheral surfaces to either side of said pivot axis, whereby substantially identical valve body portions are provided for cooperating with substantially identical and oppositely disposed valve seats and orifices located to either side of said pivot axis, to thereby form a composite valve having a pair of generally circular valve orifices disposed to either side of a central axis.

17. A valve according to claim 16 and further including operating shaft means extending coaxially with said pivot axis and mounting said valve body for rotation relative to the valve orifices.

18. A valve according to claim 17 and further including motorized drive means for rotating said operating shaft in directions for opening and closing said valve, said direction of rotation being such that during opening, respective first curvilinear surfaces initially encounter the valve orifices, to achieve said initial relatively slow opening and following relatively rapid opening of the valve, as the valve body is rotated relative to the valve orifices.

19. A valve according to claim 1 and further including operating shaft means extending coaxially with said pivot axis and mounting said valve body for rotation relative to the valve orifice.

20. A valve according to claim 19 and further including motorized drive means for rotating said operating shaft in directions for opening and closing said valve, said directions of rotation being such that during opening, the first curvilinear surface initially encounters the valve orifice, to achieve said initial relatively slow opening and following relatively rapid opening of the valve, as the valve body is rotated relative to the valve orifice.

* * * * *